United States Patent
Fletcher et al.

[15] 3,686,289
[45] Aug. 22, 1972

[54] PRODUCTION OF PERCARBOXYLIC ACIDS

[72] Inventors: John Vincent Fletcher, 10 Valley Way, Knutsford; Dennis Martin, 26 Alderdale Rd., Cheadle Hulme, both of England

[22] Filed: April 7, 1969

[21] Appl. No.: 813,847

[30] Foreign Application Priority Data

April 5, 1968 Great Britain..........16,579/68

[52] U.S. Cl. ............................................260/502 R
[51] Int. Cl................................................C07c 73/10
[58] Field of Search..........260/502 R, 553 R; 23/207

[56] References Cited

UNITED STATES PATENTS

| | | | |
|---|---|---|---|
| 1,052,762 | 2/1913 | Stern | 260/553 R |
| 2,479,111 | 8/1949 | Harris | 23/207 |
| 1,210,570 | 1/1917 | Weber | 260/553 R |
| 2,877,266 | 6/1957 | Korach | 260/502 R |
| 2,814,641 | 11/1957 | Phillips | 260/502 R |

FOREIGN PATENTS OR APPLICATIONS 929,077 6/1963 Great Britain.........260/502 R

*Primary Examiner*—Bernard Helfin
*Assistant Examiner*—W. B. Lone
*Attorney*—McDougall, Hersh, Scott & Ladd

[57] ABSTRACT

A percarboxylic acid solution is produced from an adduct of urea and hydrogen peroxide by mixing this adduct with an extracting solvent constituted by a lower alkyl ester, a lower alkyl ketone or a lower alkyl ortho-phosphate, whereby a hydrogen peroxide solution in the extracting solvent results; the said extracting solvent is replaced with the carboxylic acid corresponding to the required percarboxylic acid, whereby reaction of the carboxylic acid with the hydrogen peroxide occurs to give the required percarboxylic acid in solution in said carboxylic acid from which solution water resulting during the reaction is removed by azeotropic distillation.

10 Claims, 1 Drawing Figure

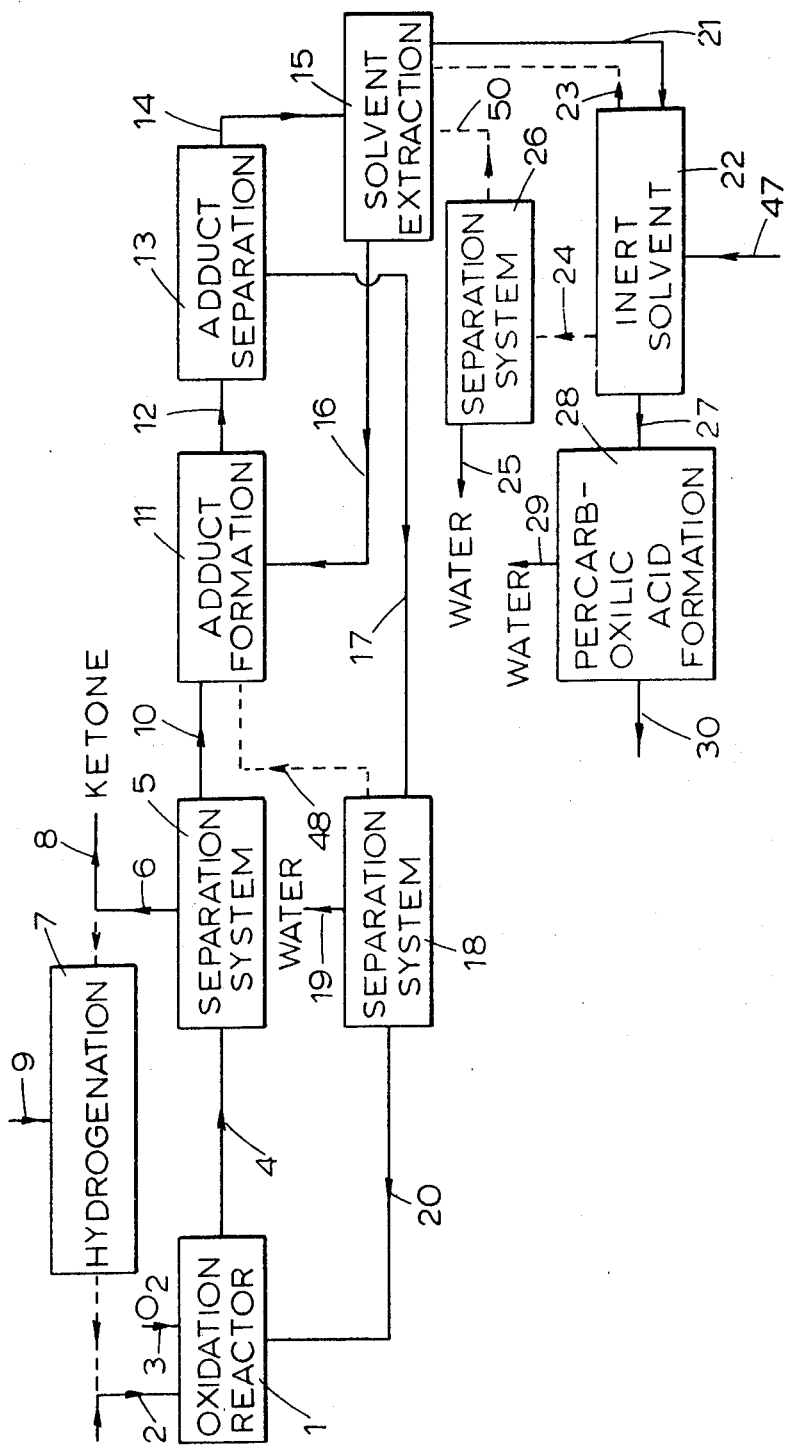

PRODUCTION OF PERCARBOXYLIC ACIDS

Many proposals have been made to produce peracids (e.g. peracetic acid) from hydrogen peroxide and these proposals have been published for many years. Nevertheless, despite the fact that these proposals have been thoroughly tried and investigated for many years, in the epoxidation of low molecular weight olefins none of them have proved to be a commercially feasible method, mainly because of excessive production cost and unsuitability of the peracid produced thereby as a reactant in further chemical reaction.

We have now found, surprisingly, that under certain conditions, described in detail hereinafter, it is possible to produce percarboxylic acid solutions suitable for further reaction on a technical scale and more economically than hitherto, by way of a hydrogen peroxide adduct, as described in greater detail hereinafter.

The present invention provides a process for the production of a percarboxylic acid solution, which process comprises mixing an adduct of urea and hydrogen peroxide with an extracting solvent selected from the group consisting of alkyl ketones with up to seven carbon atoms, alkyl esters with up to seven carbon atoms and alkyl ($C_1$ to $C_4$) ortho-phosphates, whereby the hydrogen peroxide is dissolved in said extracting solvent and a large part of the urea is recovered as a solid, and replacing or mixing said extracting solvent in the resulting hydrogen peroxide solution with a carboxylic acid of the formula $$R\text{---CO·OH}$$

in which
R is selected from the group consisting of hydrogen, phenyl, alkyl radicals with up to five carbon atoms and alkyl radicals with up to five carbon atoms substituted with at least one electrophilic substituent, or a mixture of two or more of said carboxylic acids, in an inert solvent, thus producing a percarboxylic acid solution, removing any water present in the remaining peracid solution by azeotropic distillation, the process being carried out in the essential absence of heavy metal ions and under conditions minimizing decomposition.

In the process of the invention it is possible to use a urea/hydrogen peroxide adduct obtained by reacting a hydrogen peroxide solution with a solution of urea (preferably a concentrated aqueous one) to give a precipitate of an adduct thereof and hydrogen peroxide in the molar ratio of 1:1, the process being carried out in the essential absence of heavy metal ions and under conditions minimizing decomposition. Preferably the last mentioned starting material hydrogen peroxide solution has a hydrogen peroxide concentration of from 1 to 25 percent by weight; furthermore, said solution is preferably obtained by oxidizing in the liquid phase a secondary alcohol having three to six carbon atoms (isopropanol is the preferred such alcohol) with oxygen or a gas containing oxygen at an elevated temperature, in the essential absence of heavy metal ions and under conditions minimizing decomposition, at a pressure sufficient to maintain said alcohol and the reaction product (comprising unreacted secondary alcohol, hydrogen peroxide and a ketone) in the liquid phase and removing the ketone from the hydrogen peroxide and unreacted secondary alcohol.

It is also within the scope of the present invention to produce the said percarboxylic acid from an adduct of hydrogen peroxide and urea obtained by an method other than the one described, e.g. concentration of non-aqueous solutions of hydrogen peroxide and urea by distillation under conditions in which the hydrogen peroxide and the adduct are stable, which method is in actual use or described in the literature on the subject. However, on a large scale this may be less advantageous than the preferred method described above.

When the hydrogen peroxide is produced from isopropyl alcohol the procedure up to the adduct formation is preferably as set out in copending Application No. 813,899,[1] (1. entitled "Improvements In Or Relating To The Production Of Propylene Oxide" and filed concurrently herewith,) of which the relevant disclosure is incorporated herein by reference; said procedure is applicable not only to isopropanol starting material, but also the other above secondary alcohols.

The replacement or mixing of the extracting solvent from the peroxidic solution by one of the above carboxylic acids which may be diluted by an inert solvent (for example benzene), then takes place. In the case where the extracting solvent has a higher boiling point than the carboxylic acid, e.g. tri-n-butyl-phosphate, the solvent is not removed during the addition of the carboxylic acid. However, it is best to actually replace an extracting solvent having a lower boiling point than the carboxylic acid therewith and in the case of acetone it is essential that replacement with the carboxylic acid should take place to avoid oxidation and other undesirable phenomena. The carboxylic acid must be diluted with an inert solvent to facilitate the removal of water as an azeotrope. Furthermore, in this instance the extracting solvent will not be recycled through the solvent displacement stage but will be returned directly to the solvent extraction stage. The preferred carboxylic acid is acetic acid. The replacement operation may be effected by adding in one batch sufficient carboxylic acid to produce a solution of peroxidic compounds of the desired concentration and distilling off excess solvent or adding continuously an amount of carboxylic acid equivalent to the amount of solvent being removed by distillation. This procedure may be carried out continuously or batch-wise at a temperature which is preferably of from 30° to 80°C. The attainment of these temperatures will require vacuum operation, the extent of the vacuum required being governed by the boiling point of the materials present. For example, in the case of acetic acid displacing acetone, the vacuum required is about 200 to 500 mm of mercury. While elevated temperatures may be used, temperatures in excess of 100°C tend to aid the formation of undesirable by-products which are usually of a peroxidic nature; this is especially marked when the preferred solvent, i.e. acetone, is used. High temperatures may also tend to aid the violent decomposition of these peroxides. Thus, while high temperatures increase the speed of the operation and permit smaller equipment to be used, the disadvantages stated above may be of greater importance. The solvent which is removed by replacement with carboxylic acid can be purified and re-used in the process.

The production of undesirable peroxidic by-products and decomposition thereof is also aided by high hydrogen ion concentrations as determined potentiometrically by taking 50 parts of the mixture and diluting with 50 parts of water. Thus, the hydrogen ion concentration of the mixture should not be allowed to rise above that of the added carboxylic acid, and mineral acids and materials (other than the carboxylic acid) which promote hydrogen ion formation should not be used.

It is sometimes useful to add a material which can stabilize the acidic solution (e.g. sodium acetate, sodium hydrogen phosphate or potassium dihydrogen phosphate). It should also be noted that the reaction vessel should be constructed from materials which will not introduce undesirable metal ions into the liquid medium nor should vessel surfaces be used which promote decomposition or help to form undesirable materials. Aluminum, certain grades of carefully passivated stainless steel, and certain inert polymeric materials may be successfully used. To the solution of peroxidic compounds in carboxylic acid there is then added a inert solvent, e.g. benzene, ethyl acetate, toluene or xylene (unless a sufficient quantity has already been added as a diluent with the carboxylic acid), which will enable any water present to be removed from the system by azeotropic distillation. Furthermore, after the removal of excess water, more water will be formed as the reaction between carboxylic acid and hydrogen peroxide takes place. The equilibrium equation is represented by

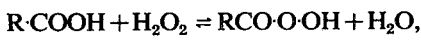

where
R has the above significance,
and the removal of water drives the equilibrium to the right. In order to increase the amount of percarboxylic acid in the equilibrium mixture shown in the above equation, it is possible, for example, to remove water (e.g. by azeotropic distillation) or to add more carboxylic acid with or without an ion exchange resin in the acid form. The azeotropic distillation may be effected at pressures other than atmospheric pressure. At subatmospheric pressures the temperature of the reacting medium will be reduced by an amount dependent upon the vapor pressure of the reactants and products at the pressure, which may be advantageous in minimizing losses due to decomposition of the percarboxylic acid and peroxides, while superatmospheric pressures increase the boiling point of reactants with corresponding increases in the rate of formation of the percarboxylic acid but losses due to decomposition may be more obvious.

The above reaction must be conducted in a vessel from which metal ions which may cause decomposition of the reactants and products have been rigorously excluded, and the surface of the vessel must be of the type which minimizes catalytic surface effects and the possible release of metal ions into the reacting mixture, for example glass or other siliceous materials or aluminum.

The carrying out of the process of the invention is illustrated in the accompanying diagrammatic drawing which shows a block diagram of the stages of the process. Referring to the drawing, secondary alcohol (i.e. isopropanol) feed to oxidation reactor 1 (described below) is derived partly by recycling of unreacted secondary alcohol via line 20 from a separation system 18 constituted by a distillation unit, and partly by the addition of secondary alcohol via line 2.

In the reactor 1, the secondary alcohol is oxidized with oxygen or an oxygen containing gas which is fed to the reactor via line 3. The resulting oxidized mixture is removed by line 4 to a separation system 5 consisting of a distillation unit in which the co-product ketone is separated by distillation from the oxidized mixture, and removed via line 6. The ketone is then removed as a by-product through line 8 or is passed to a hydrogenation reactor 7 (e.g. a fixed bed catalytic one), in which it is reacted with hydrogen supplied via line 9, to form the secondary alcohol which may be recycled to the reactor via line 2. The remainder of the oxidized mixture, after separation of the ketone in the separation system 5, is passed via line 10 to an adduct formation stage 11 constituted by a stirred tank, e.g. of aluminum, where it is reacted with an aqueous solution of urea recycled from solvent extraction stage 15 constituted by another stirred tank, e.g. of aluminum, via line 16. Instead of a stirred tank, the extraction stage 15 can take the form of a column of the adduct, the solvent being passed through said column in counter-current fashion. The mixture, now containing the crystalline adduct, is passed via line 12 to adduct separation stage 13 consisting of a filter, whereupon the solid adduct is separated and passed via line 14 to the solvent extraction stage 15, while the mother liquor is passed via line 17 to separation stage 18, in which water is separated as an azeotrope and removed via line 19, and unreacted urea is removed via line 48 in known manner to the adduct formation stage 11; the essentially anhydrous secondary alcohol is recycled via line 20 to the oxidation reactor 1.

Recycle solvent to the extraction stage 15 from solvent displacement stage 22 consisting of a distillation unit can be passed directly by line 23; alternatively, if water present due to any decomposition of hydrogen peroxide has to be removed, the recycle solvent passes via line 24 to an azeotropic stage 26 consisting of a distillation unit to remove water which leaves by line 25, the recycle solvent leaving by line 50. The solution of hydrogen peroxide leaves the solvent extraction stage by line 21 to the solvent displacement stage 22, while the urea leaves via line 16 to the adduct formation stage 11. Simultaneously, the necessary amount of inert solvent or mixture of inert solvent and carboxylic acid to replace the extraction solvent is passed via line 47 to the solvent displacement stage 22 while the hydrogen peroxide in inert solvent or mixture of inert solvent and carboxylic acid leaves via line 27 to the percarboxylic acid formation stage 28 consisting of a distillation unit, in which the hydrogen peroxide is reacted with carboxylic acid and the water formed is simultaneously removed as an azeotrope via line 29. The percarboxylic acid solution leaves via line 30.

The following examples, in which the procedure described by reference to the drawing was used, illustrate the invention.

EXAMPLE 1

1,060 cc of a solution containing 1,000 cc of isopropanol, 40 cc of acetone and 20 cc of 86 percent aqueous hydrogen peroxide were oxidized with air, which passed through the solution at a rate of 1,060 cc/min for 4 hours, in a glass enamel lined reactor at 105°C and 35 p.s.i.g. A suitable such glass lined reactor is described in U.S. Pat. No. 2,871,104 of F. F. Rust, patented Jan. 27, 1959. The co-product acetone was removed as an overhead stream by condensation from the spent air passing from the reactor. The resulting peroxidic solution was cooled to 50°C, and treated with 237 cc of a saturated aqueous urea solution also at 50°C. The resulting urea/hydrogen peroxide adduct of the formula $$NH_2CONH_2 \cdot H_2O_2$$

which precipitated from solution was filtered and dried, and then decomposed with 1,025 cc of acetone. The acetone solution containing 52 g of hydrogen peroxide and 39 g of urea, was distilled at an initial pressure of 400 mm of Hg and a temperature of about 40°C, during which time a mixture of 1,000 cc of benzene containing 162 cc of glacial acetic acid was added continuously at a rate equivalent to the rate of removal of acetone. A final still temperature of about 45°C at a pressure of 400 mm of Hg was attained after all the acetone had been removed. 5 g of an ion exchange resin in the acid form were added to the resulting mixture of hydrogen peroxide in acetic acid and azeotropic distillation with a still temperature of 36°C at a pressure of 255 mm was then effected. The water of reaction which was formed according to the equilibrium reaction represented by $$CH_3CO \cdot OH + H_2O_2 \rightleftharpoons CH_3CO \cdot O \cdot OH + H_2O$$

was collected overhead as an azeotrope with benzene. The resulting solution of peracetic acid in acetic acid contained 104 g of peracetic acid, 0.51 g of hydrogen peroxide, 39 g of urea and 1.2 g of water.

In the following further examples the urea/hydrogen peroxide adduct was produced as in example 1; where a sulphonic acid exchange resin was employed, it was Amberlite (Registered Trade Mark) I.R. 120 in the acid form.

EXAMPLE 2

1,000 g of the urea/hydrogen peroxide adduct was counter-currently extracted with 6,800 ml of n-propyl acetate. To the resulting solution of hydrogen peroxide containing a small quantity of urea was added 100 g of a sulphonic acid cationic exchange resin, followed by 584 g of glacial acetic acid in one batch. Distillation was carried out through a 15 theoretical plate laboratory column at a pressure of 360 mm of mercury during which time 159 g of water were removed from the distillate. The resulting solution of peracetic acid contained less than 0.5 percent by weight of water and was in a suitable condition for further chemical reaction, for example for the production of propylene oxide from propylene in the manner described in co-pending application No. 813,899, entitled "Improvements In Or Relating To The Production Of Propylene Oxide" and filed concurrently herewith.

EXAMPLE 3

100 g of the urea/hydrogen peroxide adduct was extracted with 100 ml of ethyl acetate. The resulting solution containing 8.1 g of hydrogen peroxide and 0.3 g of urea was distilled at 230 mm of mercury with a base temperature of 65°C during which time 100 ml of toluene containing 2.5 g of chloroacetic acid was added continuously at a rate equivalent to the rate of removal of ethyl acetate. After removal of ethyl acetate, 3 g of sulphonic acid cation exchange resin were added and an azeotropic distillation using a Dean and Stark apparatus was carried out at a still temperature of 65°C at a pressure of 100 mm of mercury. 4.3 g of water were collected in the Dean and Stark trap, and the resulting solution of chloroperoxyacetic acid was suitable for further chemical reaction, for example for the production of propylene oxide from propylene as described in co-pending application No. 813,899.[1] (1. entitled "Improvements In Or Relating To The Production Of Propylene Oxide " and filed concurrently herewith.

EXAMPLE 4

Example 3 was repeated, but using 2.7 g of isobutyric acid in place of chloroacetic acid; 4.3 g of water were collected in the Dean and Stark trap. The resulting peroxyisobutyric acid was a solution in isobutyric acid containing a small amount of water and also a little hydrogen peroxide.

EXAMPLE 5

500 g of the urea/hydrogen peroxide adduct was decomposed with 3,000 ml of tri-n-butyl-phosphate. To the resulting solution of hydrogen peroxide 855 g of trichloroacetic acid dissolved in 1,100 ml of benzene were added in one batch. The mixture was distilled through a 15 theoretical plate column and 86 g of water were removed as the benzene azeotrope. The resulting solution of peroxytrichloroacetic acid was suitable for further chemical reaction, for example for the production of propylene oxide from propylene as described in co-pending application No. 813,899.[1] (1. Entitled "Improvements In Or Relating To The Production Of Propylene Oxide" and filed concurrently herewith.)

EXAMPLE 6

500 g of the urea/hydrogen peroxide adduct was extracted counter-currently with 3,400 ml of n-propyl acetate. To the resulting solution of hydrogen peroxide was added 50 g of a sulphonic acid cation exchange resin followed by 655 g of phenylacetic acid in 3,500 ml of xylene continuously at a rate equivalent to the rate of removal of the n-propyl acetate. The still temperature was 60°C at an applied vacuum of 360 mm of mercury. 79 g of water were removed as an azeotrope in the overhead stream. The resulting solution of phenyl-peroxyacetic acid was suitable for further chemical reaction, for example for the production of propylene oxide from propylene as described in co-pending application No. 813,899.[1] (1. Entitled "Improvements In Or Relating To The Production Of Propylene Oxide" and filed concurrently herewith.)

The invention described herein is closely associated with the invention described in co-pending application Nos. 813,899, 813,907 and 813,832,[2] (2. Entitled, respectively, "Improvements In Or Relating To The Production Of Propylene Oxide," "Improvements In Or Relating To The Production Of Hydrogen Peroxide," and "Improvements In Or Relating To The Production Of Epoxides, Glycols And Glycol Esters," and filed concurrently herewith.) and the disclosures of said co-pending applications are incorporated herein by reference.

Although the present invention is described herein with particular reference to specific details, it is not intended that such details shall be regarded as limitations upon the scope of the invention except insofar as included in the accompanying claims.

We claim:

1. A process for the production of a percarboxylic acid comprising mixing an adduct of urea and hydrogen peroxide with an extracting solvent selected from the group consisting of alkyl ketones with up to seven carbon atoms, alkyl esters with up to seven carbon atoms and alkyl ($C_1$ to $C_4$) ortho-phosphates, whereby the hydrogen peroxide is dissolved in said extracting solvent and a large part of the urea is recovered as a solid, and contacting said extracting solvent in the resulting hydrogen peroxide solution with a carboxylic acid of the formula $$R\text{---CO·OH}$$

in which R is selected from the group consisting of hydrogen, phenyl, alkyl radicals with up to five carbon atoms and alkyl radicals with up to five carbon atoms substituted with at least one chlorine atom, or a mixture of two or more of said carboxylic acids, in the presence of an inert solvent which forms an azeotrope with water, thus producing a percarboxylic acid solution, removing any water present in the remaining peracid solution by azeotropic distillation, the process being carried out in the essential absence of heavy metal ions.

2. A process according to claim 1, in which the urea/hydrogen peroxide adduct used as a starting material is obtained by reacting a hydrogen peroxide solution with a solution of urea to give a precipitate of an adduct of urea and hydrogen peroxide in the molar ratio of 1:1, the process being carried out in the essential absence of heavy metal ions.

3. A process according to claim 2, in which the starting material hydrogen peroxide solution has a hydrogen peroxide concentration of from 1 to 25 percent by weight.

4. A process according to claim 3, in which the starting material hydrogen peroxide solution has been obtained by oxidizing in the liquid phase a secondary alcohol having three to six carbon atoms with oxygen or a gas containing oxygen at an elevated temperature, in the essential absence of heavy metal ions and under conditions minimizing decomposition, at a pressure sufficient to maintain said alcohol and the reaction product comprising unreacted secondary alcohol, hydrogen peroxide and a ketone in the liquid phase and removing the ketone from the hydrogen peroxide and unreacted secondary alcohol.

5. A process according to claim 4, in which said secondary alcohol is isopropanol.

6. A process according to claim 2, in which said urea solution is a saturated aqueous one.

7. A process according to claim 1, in which the extracting solvent is acetone.

8. A process according to claim 1, in which said extracting solvent is selected from ethyl acetate and n-propyl acetate.

9. A process according to claim 1, in which said carboxylic acid is acetic acid.

10. A process according to claim 1, in which said hydrogen peroxide solution is a hydrogen peroxide solution in isopropanol which solution has been obtained by oxidizing the latter, said extracting solvent is acetone and said carboxylic acid is acetic acid.

* * * * *

UNITED STATES PATENT OFFICE

CERTIFICATE OF CORRECTION

Patent No. 3,686,289            Dated August 22, 1972

John Vincent Fletcher and Dennis Martin

It is certified that errors appear in the above identified patent and that said Letters Patent are hereby corrected as shown below:

Cover page, between items [72] and [22] please insert
-- Assignee: Burmah Oil Trading Limited, London, England --

Signed and sealed this 6th day of March 1973.

(SEAL)
Attest:

EDWARD M. FLETCHER, JR.          ROBERT GOTTSCHALK
Attesting Officer                Commissioner of Patents